May 25, 1954     C. W. WELCH     2,679,160
ACTUATING CYLINDER ASSEMBLY TEST DEVICE
Filed June 15, 1949
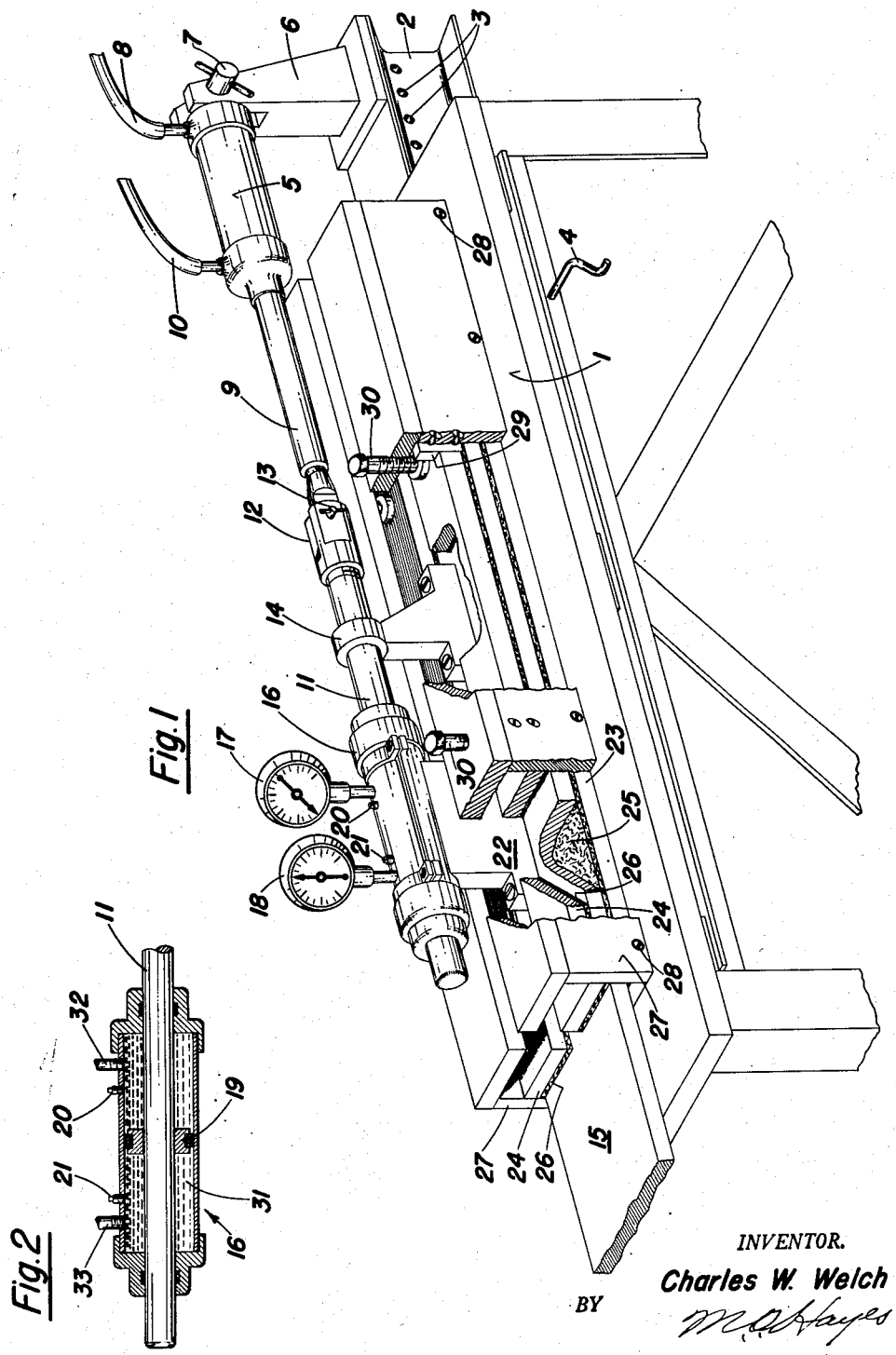
INVENTOR.
Charles W. Welch
BY
ATTORNEY Patented May 25, 1954

2,679,160

UNITED STATES PATENT OFFICE 2,679,160

ACTUATING CYLINDER ASSEMBLY TEST DEVICE

Charles W. Welch, Oakland, Calif.

Application June 15, 1949, Serial No. 99,261

6 Claims. (Cl. 73—116)

(Granted under Title 35, U. S. Code (1952), sec. 266)

This invention relates to hydraulic testing devices and more particularly to devices for dynamically testing hydraulic actuating cylinder assemblies.

The term "actuating cylinder assembly," as used herein, refers to a piston-cylinder mechanism, very common in hydraulic systems, that is used to impart motion to a displaceable member, such as the landing gear of an aircraft.

When an actuating cylinder assembly is built or repaired after damage, it is desirable to test the cylinder assembly before installation in equipment. The conventional method for testing a cylinder assembly of this type comprises a static test which consists of applying hydraulic pressure to the piston and determining the leakage, or other defect, at a particular position of the piston stroke. This method is inadequate because the actuating cylinder assembly is tested at only one position, or group of spaced positions, in the piston stroke. The cylinder assembly may appear satisfactory in a static test and yet prove to be unsatisfactory when placed in operation, since such defects as insufficient clearance, constricted flow passages, and flaws or variations in the surface of the cylinder or piston may not have become apparent in the static test.

The present invention, therefore, comprises a dynamic means for testing actuating cylinder assemblies under a wide range of working pressures. Broadly, the invention comprises a device whereby an actuating cylinder assembly can be operated under varying conditions of load, and the force output of the actuating cylinder assembly can be measured continuously throughout the stroke of the piston, whereby any irregularity in the actuating cylinder assembly force output may be immediately noted.

For a better understanding of the invention, reference is made to the following specification of a presently preferred embodiment of the invention, said specification to be read in conjunction with the accompanying drawings, wherein Fig. 1 is a perspective view, partly cut away, of a device embodying the invention, and Fig. 2 is a longitudinal cross section of the static cylinder assembly illustrated in Fig. 1.

Referring to the drawings, a base 1 is provided for supporting the test device. A support beam 2 is mounted under the base 1 at one end thereof, and is longitudinally displaceable therealong. The support beam 2 is provided with a series of spaced transverse holes 3 for selectively receiving a transverse pin 4 slidably mounted in base 1, whereby said support beam may be fixed in a predetermined longitudinal position relative to base 1. An actuating cylinder assembly 5 to be tested is mounted at one end thereof on brace 6 which is located on the outer end of beam 2, and said cylinder assembly is fixed thereto by means of a lock pin 7. By analogy to the term "actuating cylinder assembly" the term "static cylinder assembly" is defined to include the assembly comprising the cylinder or barrel and the associated piston and piston rod.

Hydraulic fluid for displacing the piston (not shown) of the actuating cylinder assembly 5 from the mounted end of said cylinder assembly to the unmounted end thereof is supplied through hose 8; hydraulic fluid for returning said piston to said mounted end of said cylinder assembly is supplied through hose 10. A piston rod 9 is provided as an integral part of said actuating cylinder assembly 5, one end thereof being permanently fixed to the piston of said actuating cylinder assembly. The free end of said piston rod 9 is attached to a rod 11 of a static cylinder assembly 16 through yoke 12 and pin 13. The rod 11 is slidably supported in a bearing bracket 14 which is firmly attached to a longitudinally displaceable plate 15. The rod 11 is the piston rod of the static cylinder assembly which assembly includes a cylinder 16 and a piston 19 which is fixed to rod 11. The piston 19 is positioned substantially in the central portion of the cylinder 16, and gauges 17 and 18 are connected to the cylinder on either side of said piston through conduits 32 and 33 respectively. Plugs 20 and 21, positioned respectively adjacent gauges 17 and 18, are provided whereby fluid 31 can be admitted to cylinder 16 on either side of piston 19.

Cylinder 16 is firmly connected to plate 15 by means of support 22. Plate 15 is mounted between braking plate 23 and spaced braking plates 24, having, respectively, braking surfaces 25 and 26. The lower plate 23 is firmly connected by screws 28 to the upright side members of right-angle-shaped guides 27, said members 27 being in turn fixedly mounted on base 1. Keys 29 lock upper plates 24 against longitudinal displacement, but permit vertical displacement thereof. Guides 27, together with plates 24 and associated braking surfaces 26, are separated to permit longitudinal movement of plate 15 and support 22 relative to base 1. A friction-introducing system of this type is known as a friction plate system, and can be used interchangeably with any other form of brake, friction or otherwise.

It will be seen that braking surfaces 25 and 26 can be made to press against plate 15 with variable force by means of adjustment bolts 30 that are threaded through the inwardly extending flange portions of the guides 27. It will be apparent that members 27 can be formed of angle iron, or can be formed in two parts, as illustrated herein, the flange portion thereof being welded or otherwise fixed to the side portions. It will also be seen that an axial force in either direction acting on the piston rod 9, in opposition to the braking force on the plate 15, will be transmitted through rod 11, piston 19 and fluid 31, and that its magnitude will be indicated on the corresponding gauge 17 or 18.

Operation

The actuating cylinder assembly 5 to be tested is set up as shown in Fig. 1, the support beam 2 being longitudinally adjusted in accordance with the length of the particular actuating cylinder assembly being tested. The conduits 8 and 10 are connected to a source of hydraulic fluid under pressure, and the piston rod 9 is connected to rod 11. The bolts 30 are adjusted to provide the desired braking pressure. Hydraulic fluid is then introduced into the actuating cylinder assembly 5 through hose 8 or 10, depending upon the direction of travel desired. It will be apparent that movement of the piston of the actuating cylinder assembly from right to left, as viewed in Fig. 1, will cause a positive reading in gauge 18. The reading of gauge 18 will indicate the magnitude of the force exerted by the actuating cylinder assembly 5 as the piston thereof is displaced. Similarly, gauge 17 will indicate the magnitude of the force exerted when the piston of the cylinder assembly 5 moves from left to right. In either event, for a given force introduced by plate 15, either a substantially constant reading or a smoothly varying reading should appear on said gauges 17 and 18. Any sudden dips or peaks in the gauge reading would indicate a defect in the actuating cylinder assembly 5. The magnitude of the dips or peaks would be a function of the type and seriousness of said defects. It will be apparent, of course, that various means can be used for indicating the instantaneous position of the piston at the time the reading varies, so as to locate the part of the cylinder which is defective.

It will thus be seen that there has been provided a device whereby an actuating cylinder assembly can be dynamically tested under varying conditions of load. Means are provided to indicate the performance of the cylinder assembly under each condition of load, said means providing a smooth response to indicate a perfect actuating cylinder assembly and providing an irregular response to indicate an imperfect actuating cylinder assembly, the position or time occurrence and magnitude of the irregularities in the irregular response being a function of the position and magnitude of the imperfections in said actuating cylinder assembly.

It will be apparent that this device can also be used to perform static tests on actuating cylinder assemblies, either for one given position or for a series of spaced positions. It will also be apparent that the specific details of the invention can be varied within wide limits, and that the specific elements illustrated merely comprise the presently preferred embodiment of the invention. For example, any convenient system, mechanical or electric, can be employed to introduce varying loads; any convenient device can be used to interconnect the actuating cylinder assembly and the loading device; any convenient device, mechanical or electric, permanently recording or otherwise, can be employed to indicate instantaneous magnitude of load. It will also be apparent that the arrangement of the movable and non-movable parts can be interchanged. For example, the piston of the actuating cylinder assembly 5 can be fixed to the brace 6 and the cylinder of the actuating cylinder assembly 5 can be connected to the rod 11. A similar reversal of parts can be effected in the static cylinder assembly 16.

It will therefore be recognized that the device illustrated and described herein is merely illustrative of a presently preferred embodiment of the invention, and the invention is not to be limited thereto. The full scope of the invention is pointed out in the attached claims.

The invention described herein may be manufactured and used by or for the Government of the United States of America for governmental purposes without the payment of any royalties thereon or therefor.

What is claimed is:

1. A device for testing an actuating cylinder assembly comprising means for supporting said actuating cylinder assembly, means for applying a predetermined load thereto comprising a static cylinder assembly fixedly mounted on a friction plate system and adapted for operative engagement with the actuating cylinder assembly, means for controlling the braking force exerted by said friction plate system, and gauge means connected to said static cylinder assembly for measuring the magnitude of the force output of said actuating cylinder assembly during movement of the piston thereof.

2. A device for testing an actuating cylinder assembly comprising means for yieldably resisting displacement of the piston of said actuating cylinder assembly relative to the cylinder thereof, and means for interconnecting said actuating cylinder assembly and said displacement resisting means for measuring the force output of said actuating cylinder assembly in opposition to said displacement resisting means.

3. A testing device of the character described comprising means for fixedly mounting one of the two relatively movable elements of an actuating cylinder assembly, a static cylinder assembly mounted to be axially aligned with and operatively engaged with an actuating cylinder mounted for testing in said device, friction means for resisting displacement of said static cylinder assembly, means for producing relative displacement between the piston and the cylinder of said actuating cylinder assembly, and means for measuring the force output of said actuating cylinder assembly throughout the stroke of the piston thereof.

4. A device for testing an actuating cylinder assembly comprising means for yieldably resisting displacement of the piston of said actuating cylinder assembly relative to the cylinder thereof, and means for interconnecting said actuating cylinder assembly and said displacement-resisting means for measuring the force output of said actuating cylinder assembly in opposition to said displacement-resisting means, said interconnecting means including a static cylinder assembly, one of whose members is adapted for connection to said actuating cylinder assembly, the other member being connected to said displacement-resisting means.

5. A device for testing an actuating cylinder assembly comprising means for yieldably resisting displacement of the piston of said actuating cylinder assembly relative to the cylinder thereof, means for interconnecting said actuating cylinder assembly and said displacement-resisting means for measuring the force output of said actuating cylinder assembly in opposition to said displacement-resisting means, said interconnecting means including a static cylinder assembly, one of whose members is adapted for connection to said actuating cylinder assembly, the other member being connected to said displacement-resisting means, said displacement-resisting means comprising a friction brake.

6. A device of the character described comprising means for fixedly mounting one of the two relatively displaceable elements of an actuating cylinder assembly, a static cylinder assembly including a piston adapted to be connected to one of said elements so as to be displaced by actuation of the actuating cylinder assembly, adjustable means for applying various loads to resist the displacement of said static cylinder assembly, and means for measuring the force transmitted through said static cylinder assembly whereby to measure the force output of said actuating cylinder assembly throughout the actuating stroke thereof, said measuring means including a gauge connected to said static cylinder assembly to measure the pressure therein on either side of its piston.

References Cited in the file of this patent

UNITED STATES PATENTS

| Number | Name | Date |
|---|---|---|
| 819,584 | Olsen | May 1, 1906 |
| 932,567 | O'Connor | Aug. 31, 1909 |
| 1,874,694 | Broce | Aug. 30, 1932 |
| 2,281,871 | Corby | May 5, 1942 |
| 2,354,562 | Webb | July 25, 1944 |
| 2,419,293 | Simonson | Apr. 22, 1947 |